United States Patent
Yamasaki et al.

(10) Patent No.: US 10,065,511 B2
(45) Date of Patent: Sep. 4, 2018

(54) HYBRID DRIVE SYSTEM

(71) Applicant: Mitsubishi Electric Corporation, Chiyoda-ku, Tokyo (JP)

(72) Inventors: Hisanori Yamasaki, Tokyo (JP); Yasuhiko Wada, Tokyo (JP); Hidetoshi Kitanaka, Tokyo (JP); Keita Hatanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 312 days.

(21) Appl. No.: 14/890,872

(22) PCT Filed: Jul. 2, 2013

(86) PCT No.: PCT/JP2013/068176
§ 371 (c)(1),
(2) Date: Nov. 12, 2015

(87) PCT Pub. No.: WO2015/001621
PCT Pub. Date: Jan. 8, 2015

(65) Prior Publication Data
US 2016/0082850 A1  Mar. 24, 2016

(51) Int. Cl.
*B60L 11/18* (2006.01)
*B60W 10/26* (2006.01)
(Continued)

(52) U.S. Cl.
CPC .......... *B60L 11/1803* (2013.01); *B60L 3/00* (2013.01); *B60L 11/12* (2013.01); *B60L 11/18* (2013.01);
(Continued)

(58) Field of Classification Search
None
See application file for complete search history.

(56) References Cited

U.S. PATENT DOCUMENTS 9,108,645 B2    8/2015  Shimada et al.
2007/0255968 A1*  11/2007  Suzuki ................ G06F 1/26
                                                    713/300
(Continued)

FOREIGN PATENT DOCUMENTS

EP    2 243 699 A1    10/2010
EP    2 444 272 A1    4/2012
(Continued)

OTHER PUBLICATIONS

International Search Report (PCT/ISA/210) dated Sep. 3, 2013, by the Japanese Patent Office as the International Searching Authority for International Application No. PCT/JP2013/068176.
(Continued)

*Primary Examiner* — Jared Fureman
*Assistant Examiner* — Aqeel Bukhari
(74) *Attorney, Agent, or Firm* — Buchanan Ingersoll & Rooney PC

(57) ABSTRACT

A hybrid drive system includes first and second power supply devices that supply direct-current power; first and second power storage devices are respectively connected to the first and second power supply devices so as to accumulate or discharge the direct-current power; a first load device that receives a supply of the direct-current power from the first power supply device and the first power storage device and drives a first load; and a second load device that receives a supply of the direct-current power from the second power supply device and the second power storage device and drives a second load. The hybrid drive system includes an inter-group contactor for electrically connecting and disconnecting input terminals of the first power storage device and the second power storage device.

23 Claims, 8 Drawing Sheets

(51) Int. Cl.
*B60W 20/00* (2016.01)
*B61C 5/00* (2006.01)
*H02J 1/10* (2006.01)
*H02J 7/34* (2006.01)
*B60L 3/00* (2006.01)
*B60L 11/12* (2006.01)
*B60W 10/08* (2006.01)
*B61C 3/00* (2006.01)
*H02J 7/14* (2006.01)
*H02J 1/00* (2006.01)

(52) U.S. Cl.
CPC .......... *B60L 11/1805* (2013.01); *B60W 10/08* (2013.01); *B60W 10/26* (2013.01); *B60W 20/00* (2013.01); *B61C 3/00* (2013.01); *B61C 5/00* (2013.01); *H02J 1/10* (2013.01); *H02J 7/34* (2013.01); *H02J 7/1423* (2013.01); *H02J 2001/004* (2013.01); *Y10S 903/93* (2013.01)

(56) References Cited

U.S. PATENT DOCUMENTS

| | | | |
|---|---|---|---|
| 2010/0065349 A1 | 3/2010 | Ichikawa et al. | |
| 2010/0144219 A1 | 6/2010 | Balogh et al. | |
| 2010/0253145 A1* | 10/2010 | King | B60L 3/0069 307/46 |
| 2011/0309793 A1* | 12/2011 | Mitsutani | B60K 6/365 320/109 |
| 2012/0090499 A1 | 4/2012 | Shimada et al. | |
| 2014/0207322 A1* | 7/2014 | Hatanaka | B60L 1/003 701/22 |
| 2014/0244107 A1* | 8/2014 | Delevski | B60R 16/03 701/36 |
| 2016/0294182 A1* | 10/2016 | Li | H02J 1/00 |

FOREIGN PATENT DOCUMENTS

| | | |
|---|---|---|
| JP | 50-94460 A | 7/1975 |
| JP | 2004-336833 A | 11/2004 |
| JP | 2005-083218 A | 3/2005 |
| JP | 2008-042989 A | 2/2008 |
| JP | 2008-187884 A | 8/2008 |
| JP | 4166618 B | 10/2008 |
| JP | 2011-041386 A | 2/2011 |
| WO | WO 2013/018167 A1 | 2/2013 |
| WO | WO 2013/021486 A1 | 2/2013 |

OTHER PUBLICATIONS

Written Opinion (PCT/ISA/237) dated Sep. 3, 2013, by the Japanese Patent Office as the International Searching Authority for International Application No. PCT/JP2013/068176.

Extended European Search Report dated Mar. 30, 2017, issued by the European Patent Office in corresponding European Application No. 13888726.0. (7 pages).

\* cited by examiner

ΔV: POTENTIAL DIFFERENCE BETWEEN POWER STORAGE DEVICES
Vth: THRESHOLD VOLTAGE SET IN ADVANCE

HYBRID DRIVE SYSTEM

FIELD

The present invention relates to a hybrid drive system.

BACKGROUND

In the known art, there is, for example, a drive system for an induction motor for a railroad vehicle as described in Patent Literature 1 below. It is mentioned in Patent Literature 1 that the drive system includes a plurality of power supply sources including power supply devices that generate direct-current power and power storage devices (storage devices) connected in parallel to the outputs of the power supply devices so as to supply and accumulate direct-current power. The sets of power supply sources are connected, via an open/close-controllable switch, to an inverter device that receives individual supplies of electric power from direct-current output units, and when the power supply source electrically set to an open state by the switch is connected to the power supply source on a connection partner side, the drive system monitors the direct-current output voltage of the power supply source in the open state and the direct-current output voltage of the power supply source on the connection partner side, and it connects the power supply source in the open state when the voltage difference between both the direct-current output voltages is equal to or lower than a predetermined differential voltage.

CITATION LIST

Patent Literature

Patent Literature 1: Japanese Patent No. 4166618

SUMMARY

Technical Problem

However, according to this known technology, when, for example, a problem occurs in one power supply device, the power storage device provided on the power supply device side in which the problem occurs cannot be effectively utilized. Therefore, there is some room to improve the system configuration.

The present invention has been devised in view of the above and it is an objective of the present invention to provide a hybrid drive system that can effectively utilize a power storage device provided on a power supply device side in which a problem occurs.

Solution to Problem

In order to solve the problem and achieve the objective mentioned above, the present invention relates to a hybrid drive system that includes first and second power supply devices that supply direct-current power, first and second power storage devices respectively connected to the first and second power supply devices to accumulate or discharge the direct-current power, a first load device that receives supply of the direct-current power from the first power supply device and the first power storage device and drives a first load, and a second load device that receives supply of the direct-current power from the second power supply device and the second power storage device and drives a second load. The hybrid drive system includes an inter-group contactor for electrically connecting and disconnecting input terminals of the first power storage device and the second power storage device.

Advantageous Effects of Invention

According to the present invention, there is an effect whereby it is possible to effectively utilize a power storage device provided on a side of a power supply device in which a problem occurs.

DESCRIPTION OF EMBODIMENTS

Exemplary embodiments of the present invention are explained below with reference to the accompanying drawings. Note that the present invention is not limited by the embodiments explained below.

First Embodiment

Figure 1:
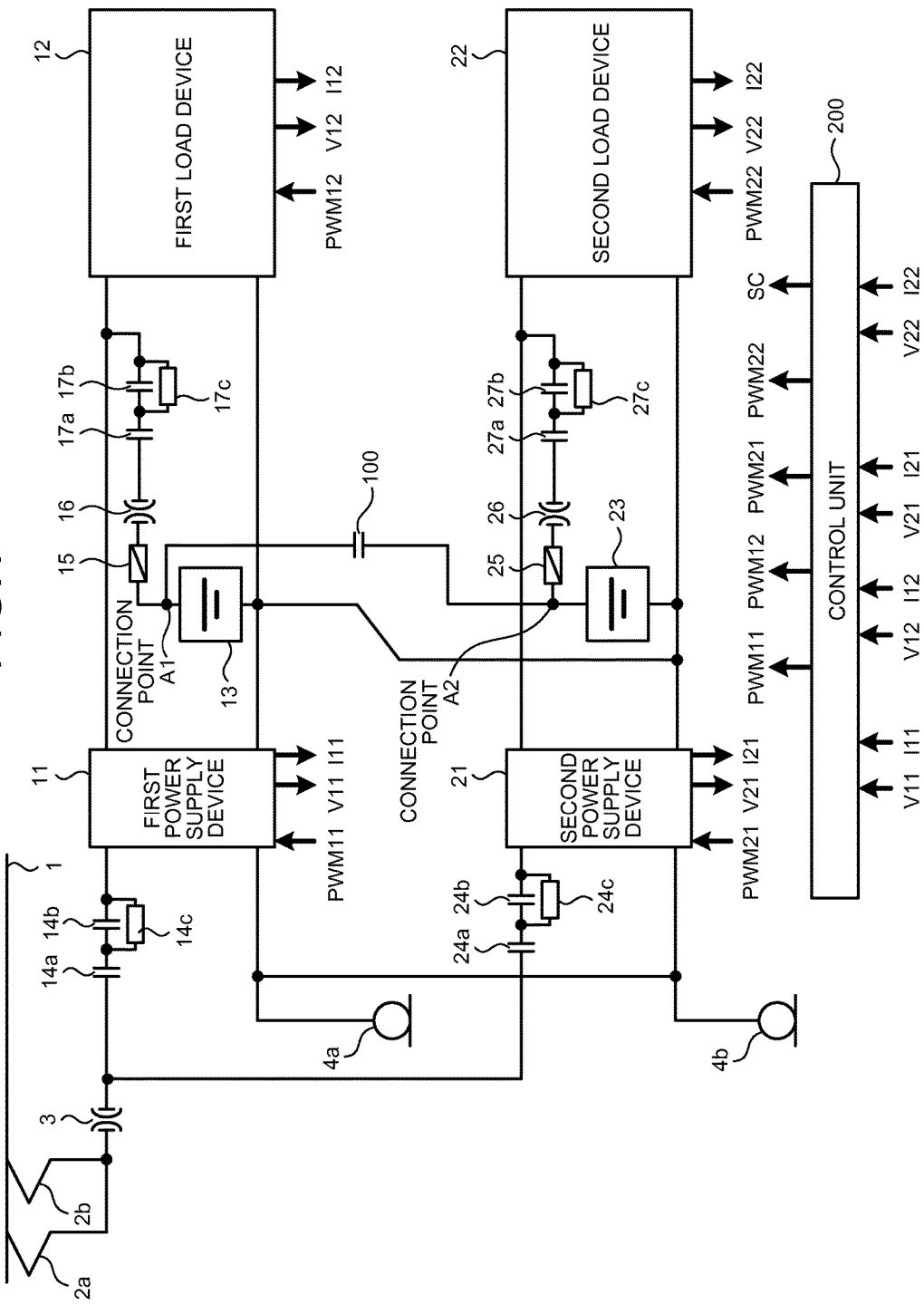
FIG. 1 is a diagram illustrating an example configuration of a hybrid drive system according to a first embodiment.

FIG. 1 is a diagram illustrating an example configuration of a hybrid drive system according to a first embodiment. In FIG. 1, the hybrid drive system according to the first embodiment is configured to receive direct-current power from a direct-current overhead wire 1 via pantographs 2 (2a and 2b) and supplies (applies) the received direct-current power to a power supply device 11 and a power supply device 21 via an overhead wire breaker 3. Further, the negative sides of the power supply device 11 and the power supply device 21 are each in contact with a rail via wheels 4 (4a and 4b).

As illustrated in FIG. 1, the hybrid drive system is configured from two hybrid systems. A first hybrid system group includes the power supply device 11, which is a first power supply device; a load device 12, which is a first load device; and a power storage device 13, which is a first power storage device. A second hybrid system group includes the power supply device 21, which is a second power supply device; a load device 22, which is a second load device; and a power storage device 23, which is a second power storage device. A control unit 200 collectively controls the first and second hybrid system groups, i.e., the entire hybrid drive system. A contactor (hereinafter referred to as "inter-group contactor") 100 for electrically connecting and disconnecting the systems is provided.

In the first hybrid system group, various components for appropriately performing the exchange of electric power are provided on the input side of the power supply device 11. These components are specifically a contactor 14a, which is a first contactor for the first power supply device; a contactor 14b, which is a second contactor for the first power supply device; and a charging resistor 14c for the first power supply device connected to the contactor 14b in parallel. The first hybrid system group includes a breaker 16 for the first power storage device; a contactor 17a, which is a first contactor for the first power storage device; a contactor 17b, which is a second contactor for the first power storage device; a charging resistor 17c for the second power storage device connected to the contactor 17b in parallel; and a fuse 15, which functions as an over-current protection element in the first power storage device.

The second hybrid system group is the same. The second power storage device is provided, on the input side of the power supply device 12, with a contactor 24a contactor 24b, and a charging resistor 24c connected to the contactor 24b in parallel. The second power storage device in the second hybrid system group includes a fuse 25, a breaker 26, a contactor 27a, a contactor 27b, and a charging resistor 27c connected to the contactor 27b in parallel.

The configurations of the power supply devices 11 and 21 and the load devices 12 and 22 are explained here. Note that, for simplification of explanation, only one of the two hybrid systems (the first hybrid system group) is explained.

Figure 2:
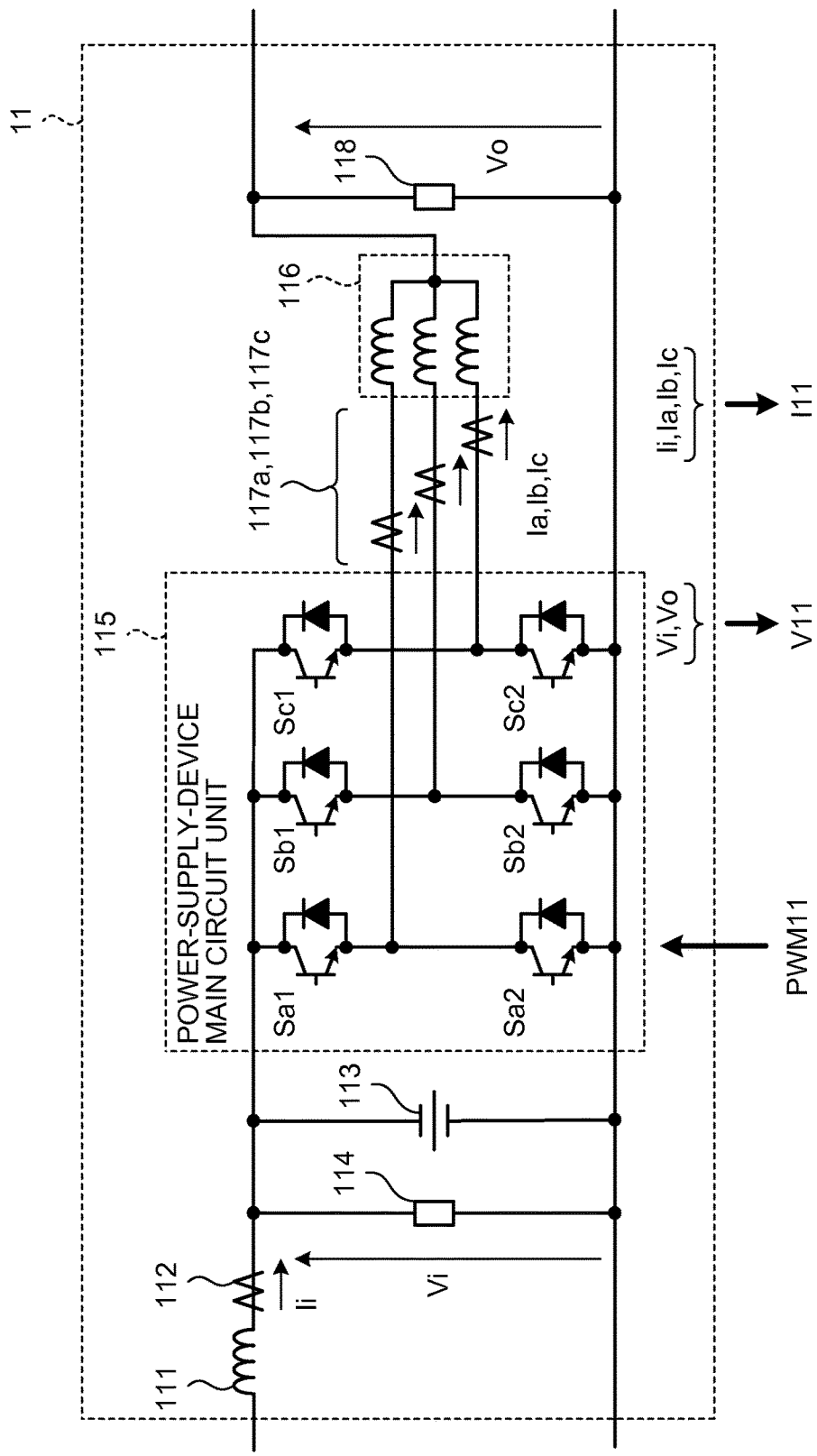
FIG. 2 is a diagram illustrating an example configuration of a power supply device.

FIG. 2 is a diagram illustrating an example configuration of the power supply device 11. The power supply device 11 operates as a DC-DC converter that converts the voltage of direct-current power supplied from the direct-current overhead wire 1 into a direct-current voltage suitable for the load device 12 and the power storage device 13 connected to the output side. Note that, in FIG. 2, a step-down DC-DC converter that converts the voltage of input direct-current power into a lower voltage is illustrated as an example. However, the power supply device 11 is not limited to this configuration.

As illustrated in FIG. 2, the power supply device 11 includes a filter reactor 111 that suppresses a rush current during an abnormal failure; an input-current measuring unit 112 that measures an input current (Ii); a filter capacitor 113 that accumulates direct-current power; an input-voltage measuring unit 114 that measures an input voltage (Vi); a power-supply-device main circuit unit 115 that performs a switching operation; an output reactor 116 for power conversion control; output-current measuring units 117 (117a, 117b, and 117c) that measure output currents (Ia, Ib, and Ic); and an output-voltage measuring unit 118 that measures an output voltage (Vo). Current information I11 (Ii, Ia, Ib, and Ic) measured by the input-current measuring unit 112 and the output-current measuring unit 117 and voltage information V11 (Vi and Vo) measured by the input-voltage measuring unit 114 and the output-voltage measuring unit 118 are input to the control unit 200. Note that, although not illustrated in the figure, the same measurement is performed in the power supply device 21 and measured current information I21 (Ii, Ia, Ib, and Ic) and voltage information V21 (Vi and Vo) are input to the control unit 200.

The control unit 200 performs operational processing on the basis of the current information I11 and I21 (Ii, Ia, Ib, and Ic), the voltage information V11 and V21 (Vi and Vo), and the like and performs processing for generating PWM (Pulse Width Modulation) control signals (PWM11 and PWM21) for ON/OFF-controlling semiconductor switches (Sa1, Sb1, Sc1, Sa2, Sb2, and Sc2) included in the power-supply-device main circuit unit 115. In accordance with this control, the power supply device 11 functions as a DC-DC converter.

Note that, in FIG. 2, a three-phase triple form is illustrated for the power-supply-device main circuit unit 115 and the output reactor 116. This is because, if the power-supply-device main circuit unit 115 is configured in three phases, it is possible to appropriately shift the switching timings of the phases of the power-supply-device main circuit unit 115. That is, a configuration in three phases is a configuration for, by shifting occurrence timings of current ripples of the phases, reducing the amplitude of a current ripple of a three-phase combined output, which is an output of the power supply device 11, reducing harmonics of an output current, or attaining a reduction in the size of a reactor. Note that, as a form other than the three-phase, for example, the power-supply-device main circuit unit 115 and the output reactor 116 can be configured in, for example, a single phase. The function of the DCDC converter is not lost.

Figure 3:
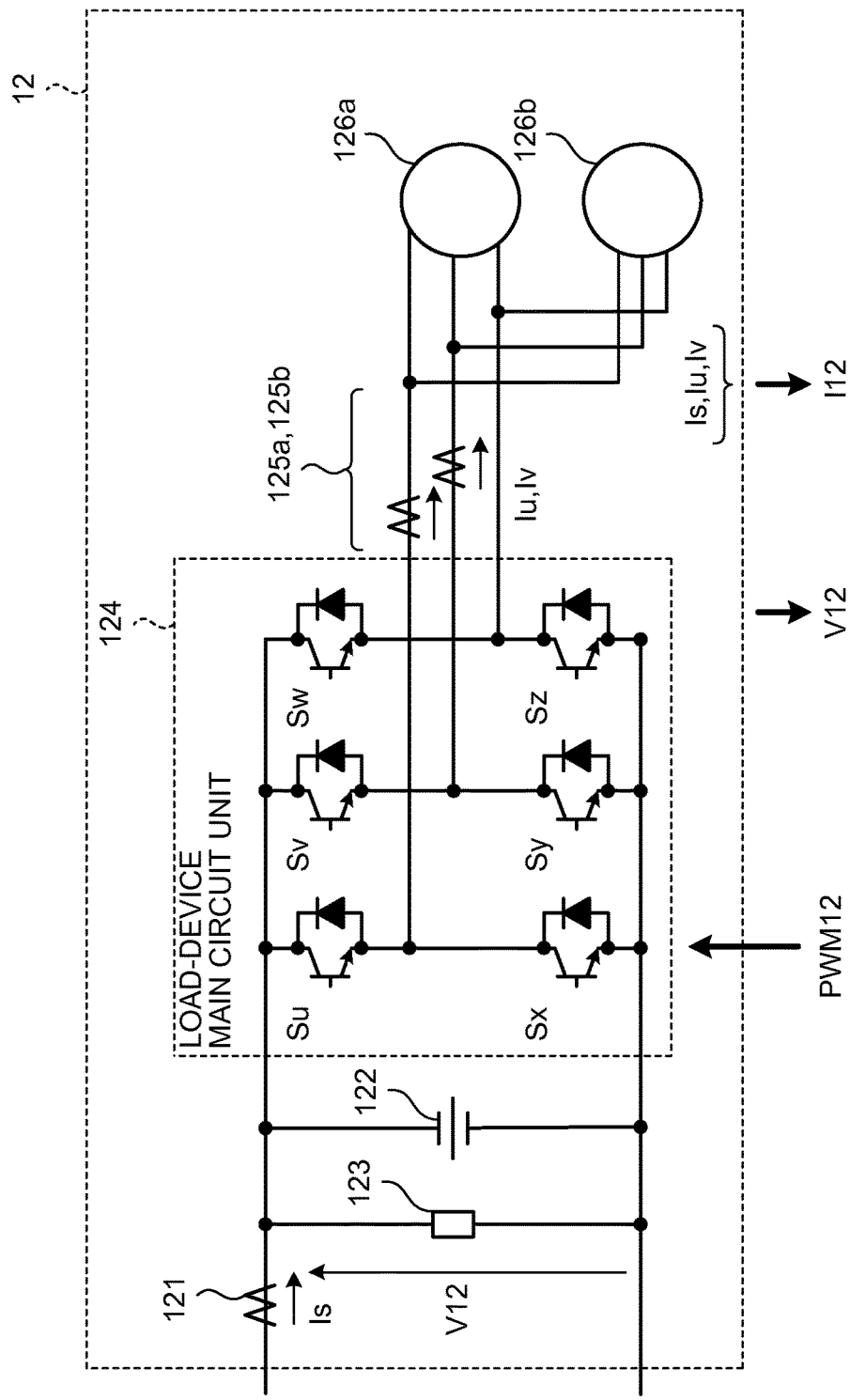
FIG. 3 is a diagram illustrating an example configuration of a load device.

The load device 12 is explained here. FIG. 3 is a diagram illustrating an example configuration of the load device 12 and is an example configuration for converting a voltage of input direct-current power into a voltage of alternating-current power and obtaining a driving force for propelling a vehicle.

As illustrated in FIG. 3, the load device 12 includes a load-input-current measuring unit 121 that measures an input current (Is); a filter capacitor 122 that suppresses pulsation of the direct-current input voltage; a load-input-voltage measuring unit 123 that measures the input load voltage; a load-device main circuit unit 124, which is a semiconductor switch circuit for what is called an inverter operation for converting a direct-current voltage into an alternating-current voltage; load-output-current measuring units 125 (125a and 125b) that measure the output current of the load-device main circuit unit 124; and alternating-current motors 126a and 126b that obtain a driving force from the alternating-current power supplied from the load-device main circuit unit 124. Current information I12 (Is, Iu, and Iv) measured by the load-input-current measuring unit 121 and the load-output-current measuring unit 125 and voltage information V12 measured by the load-input-voltage measuring unit 123 are input to the control unit 200. Note that, although not illustrated in the figure, the same measurement is performed in the load device 22 and measured current information I22 (Is, Iu, and Iv) and voltage information V22 (V12) are input to the control unit 200.

As is seen by referring back to FIG. 1, the control unit 200 performs operational processing on the basis of the current information I12 and I22 (Is, Iu, and Iv), the voltage information V12 and V22, and the like and performs processing for generating PWM control signals (PWM12 and PWM22) for ON/OFF-control of semiconductor switches (Su, Sv, Sw, Sx, Sy, and Sz) included in the load-device main circuit unit 124. Due to this control, the load-device main circuit unit 124 functions as what is called an inverter.

Functions, operations, and the like of switching devices such as the breakers and the contactors are explained here.

The contactor 14a is closed when the power supply device 11 is operating. The contactor 14a is opened, for example, when the power supply device 11 is not operating or when some abnormality occurs in the power supply device 11 and the operation is immediately stopped. That is, the contactor 14a is a contactor for controlling the connection and disconnection between the power supply device 11 and the direct-current overhead wire 1.

When starting the operation of the power supply device 11, it is necessary to charge the filter capacitor 113 (see FIG. 2) in the power supply device 11 quickly so as not to generate an over-current on the input side. Therefore, the charging resistor 14c is provided, the filter capacitor 113 is charged while being kept at an appropriate charging current value, and when the charging is completed, the contactor 14b is closed to short-circuit both ends of the charging resistor 14c. In contrast, during normal operation thereafter, the contactor 14b is always kept closed so as not to consume electric power in the charging resistor 14c.

The fuse 15 is provided to prevent an occurrence of an abnormality in the breaker 16, the load-device main circuit unit 124, and the like and to prevent an over-current continuously flowing. The breaker 16 itself is a high-speed breaker the same as the overhead wire breaker 3. However, the breaker 16 is provided to mainly break an over-current caused by the power storage device 13. The contactor 17a, the contactor 17b, and the charging resistor 17c alone respectively have functions the same as the functions of the contactor 14a, the contactor 14b, and the charging resistor 14c. However, the contactor 17a is a contactor for connecting or disconnecting the power storage device 13 and the load device 12 from each other. The charging resistor 17c is a charging resistor for limiting the charging current to the appropriate charging current to charge the filter capacitor 122 (see FIG. 3) and it is provided in an input of the load device 12. The contactor 17b is a contactor for short-circuiting the charging resistor 17c after completion of the charging of the filter capacitor 122 and preventing an input loss from occurring during driving of the load device 12. With the breakers, the contactors, and the like for the load device, it is possible to completely connect the power storage device 13 to the load device 12 or the power supply device 11 and, in addition, quickly disconnect the power storage device 13 during nonuse, during an abnormality occurrence, and the like of the power storage device 13.

Note that, when outputting a control signal to the load-device main circuit unit 124 and performing driving control on the alternating-current motors 126a and 126b, the control unit 200 controls the power-supply-device main circuit unit 115, performs power conversion control on the power supply device 11 so as to match the driving control for the alternating-current motors 126a and 126b, and performs charging and discharging control on the power storage device 13.

When an abnormality occurs in the power supply device 11, the load device 12, and the like, in order to protect the devices, the control unit 200 controls the opening of the contactors (14a, 14b, 17a, and 17b) and the breaker (16) and controls the inputs during the start of the devices. Note that, to avoid unnecessary complication, in FIG. 1, illustrations of inputs of control signals to the breaker (16) and the contactors (14a, 14b, 17a, and 17b) are omitted. Note that a signal SC illustrated as being output from the control unit 200 is a control signal for open/close controlling of the inter-group contactor 100.

With the configuration and the operational control function performed by the control unit 200 and the like described above, it is possible to perform hybrid driving wherein electric power is supplied to the load devices 12 and 22 from both of the power supply devices 11 and 21 and the power storage devices 13 and 23.

An example of operation modes is illustrated in Table 1 below. Table 1 is a table illustrating an example of operation modes of the hybrid drive system according to the first embodiment. Note that all the modes are based on the premise that the load device performs power running and power regeneration according to the running pattern of the load device.

TABLE 1

Hybrid system operation mode example

| Mode name | Power supply device control method | Power storage device behavior |
|---|---|---|
| (1) Hybrid mode | Example 1) Feed a charging current according to a charging level of the power storage device. Example 2) Supplement the charging current according to the magnitude of traveling energy of the load device. Example 3) When the power storage device is fully charged and the load device is operating regeneratively, perform current control for returning regenerative power from the load device to the overhead wire. | Charging amount changes according to charging and discharging from the power supply device, discharging during load device power running, and charging during load device regeneration. The potential of the power storage device changes according to a change in the charging amount. |
| (2) Power storage device open mode | Control the output voltage of the power supply device such that it is fixed irrespective of the operation of the load device. | Open a load input contactor to disconnect the other devices. The power supply device controls the potential of the power supply device output and the load device input to be fixed. |
| (3) Power supply device open mode (Non-electrified section traveling mode) | Open a power-supply-input contactor to always stop a power conversion operation. | Drive the load device until a residual charging amount of the power storage device decreases to a lower limit value. Regenerative energy generated by the load device is absorbed in the same manner as in the normal hybrid mode. |

Note that the operation modes illustrated in the above Table 1 are operation modes of a single hybrid system including the direct-current overhead wire and the power storage device. Further, in the first embodiment, as explained above, the hybrid system of the two-group configuration including the first and second hybrid system groups is described. The technique in the embodiment features that the power storage device of the first group (the power storage device 13) and the power storage device of the second group (the power storage device 23) can be connected and disconnected by the inter-group contactor 100 illustrated in the figure. Therefore, what are described below are the operations of connecting and disconnecting the power storage device 13 and the power storage device 23 and the effects of the operations.

First, in the first embodiment, the inter-group contactor 100 is open at normal times, and the first group and the second group are separated. Consequently, when a failure occurs in the power supply device or the load device of one of the first hybrid system group and the second hybrid system group (hereinafter referred to as "failure occurrence group"), an effect is obtained whereby it is possible to, without spreading the effect of the failure to the other group in which a failure has not occurred (hereinafter referred to as "intact group"), continue the operation of the intact group. Thereafter, after undergoing processing for stopping several devices and processing for opening several contactors, the inter-group contactor 100 is closed. Consequently, an effect is obtained whereby it is possible to resume the operation of the hybrid drive system while continuing the effective use of the power storage device of the failure occurrence group.

More specifically, in particular, an effect of the inter-group contactor 100 in the "power supply device open mode (the non-electrified section traveling mode)" of Table 1 (3) is clearly seen. When traveling along a railroad where there is no overhead wire, a vehicle needs to convert energy stored in a power storage device in the vehicle or in a formation into traveling energy so as to travel. It is assumed that, because there is a failure of the power supply device or the load device of one group in FIG. 1, this group becomes the failure occurrence group and stops. In this case, if the circuit of the inter-group contactor 100 is not provided, stored electric energy stored in the power storage device of the failure occurrence group cannot be used. At this point, the traveling energy that can be output by the formation becomes halved. In the non-electrified section, charging from the power supply device of the intact group is also impossible. Therefore, the traveling distance becomes nearly halved. That is, it is more likely that the vehicle cannot travel with its own power up to a trackside facility where the vehicle can be charged.

Meanwhile, if the inter-group contactor 100 is provided, even if the load device in one of the groups fails and becomes inoperable, by connecting the inter-group contactor 100, it becomes possible to supply all the stored electric energy in the vehicle or the formation to the load device of the intact group. As a result, a significant effect is obtained whereby it is possible to maintain a traveling distance irrespective of the failure occurrence in one of the groups and it is possible to maintain the possibility of reaching a trackside facility where the vehicle can be charged.

Note that, as explained above, in order to effectively use the power storage device for traveling in a non-electrified section, in the "hybrid traveling mode (overhead wire section traveling)" described in Table 1 (1), even when one group stops because of the occurrence of a failure in that group, it is also important to connect the inter-group contactor 100, charge the power storage devices of both the groups with the power supply device of the intact group, and charge the power storage devices of both the groups before starting to travel in the non-electrified section.

In FIG. 1, an example is illustrated in which, as connection places of the inter-group contactor 100 and the power storage devices (13 and 23), connection points of the power storage devices (13 and 23) and the fuses (15 and 25) are set up (a connection point A1 on the first group side and a connection point A2 on the second group side). Meanwhile, in FIG. 4, an example is illustrated in which, as connection points B1 and B2, in the groups, electric connection points of the breakers (16 and 26) and the contactors (17a and 27a), which are the first contactors, are set up.

Figure 4:
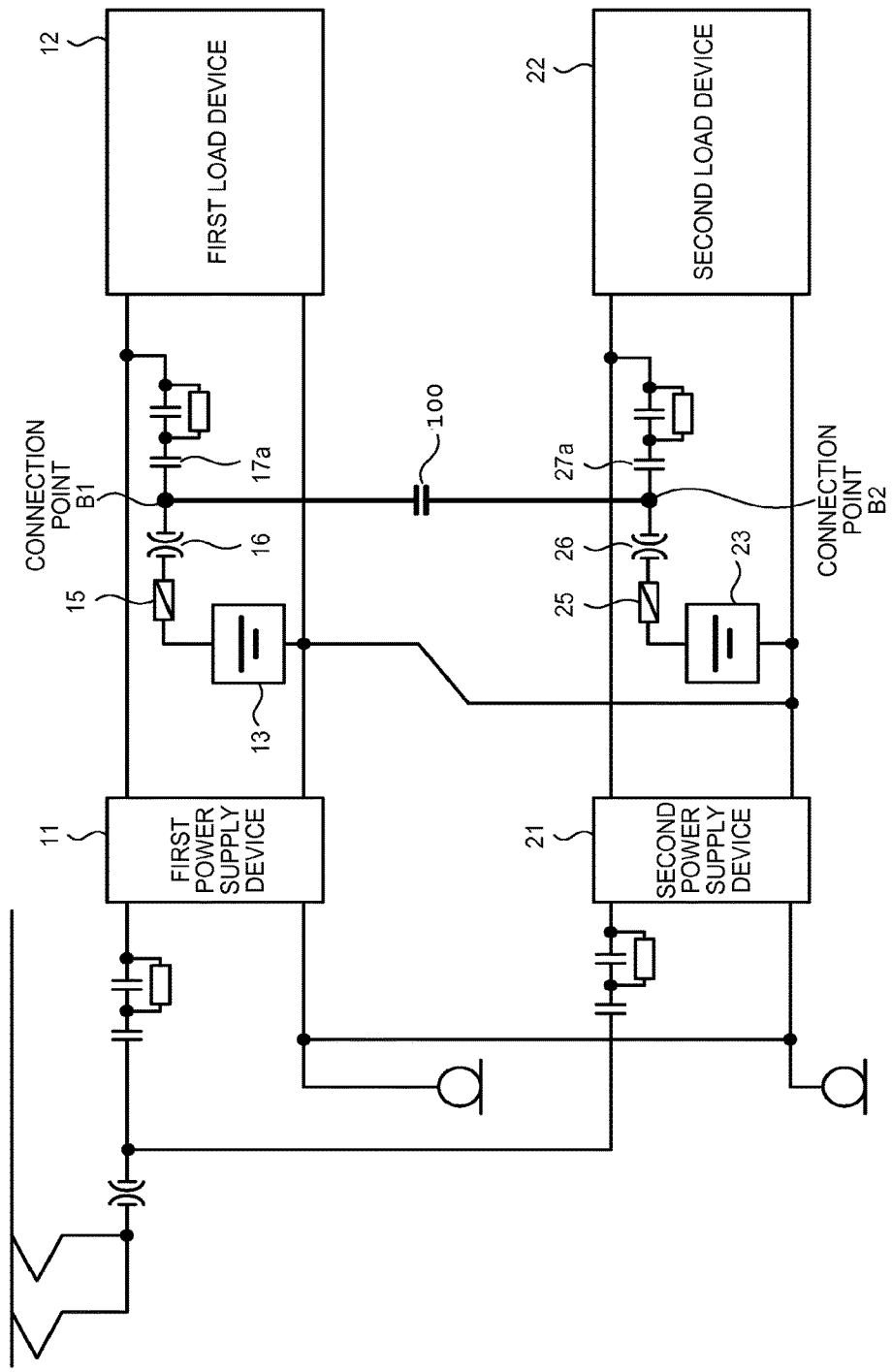
FIG. 4 is a diagram illustrating an example disposition of an inter-group contactor different from that illustrated in FIG. 1.

When one group becomes the failure occurrence group, the purpose of connecting the power storage device of the failure occurrence group to the other, intact group can be attained either in the configuration illustrated in FIG. 1 or in the configuration illustrated in FIG. 4. However, in the configuration illustrated in FIG. 1, when the inter-group contactor 100 is closed, the breaker in the power storage device of the failure occurrence group becomes opened. In contrast, in the configuration illustrated in FIG. 4, the breaker in the power storage device of the failure occurrence group is not opened and the power storage device is connected to the intact group. For example, when the load device is a railroad vehicle and protection of the device occurs in accordance with seriousness of the failure, a protecting operation for only opening the contactors or for opening the breaker as well is generally performed. However, in the configuration illustrated in FIG. 4, when the operation mode is a mode for maintaining connection of the power storage devices between the groups, a protecting operation involving an opening operation of the breaker cannot be performed. Therefore, the configuration illustrated in FIG. 1 is a more desirable configuration from the perspective that items that have a negative effect on protecting operation setting and inter-group connection setting can be reduced.

Figure 5:
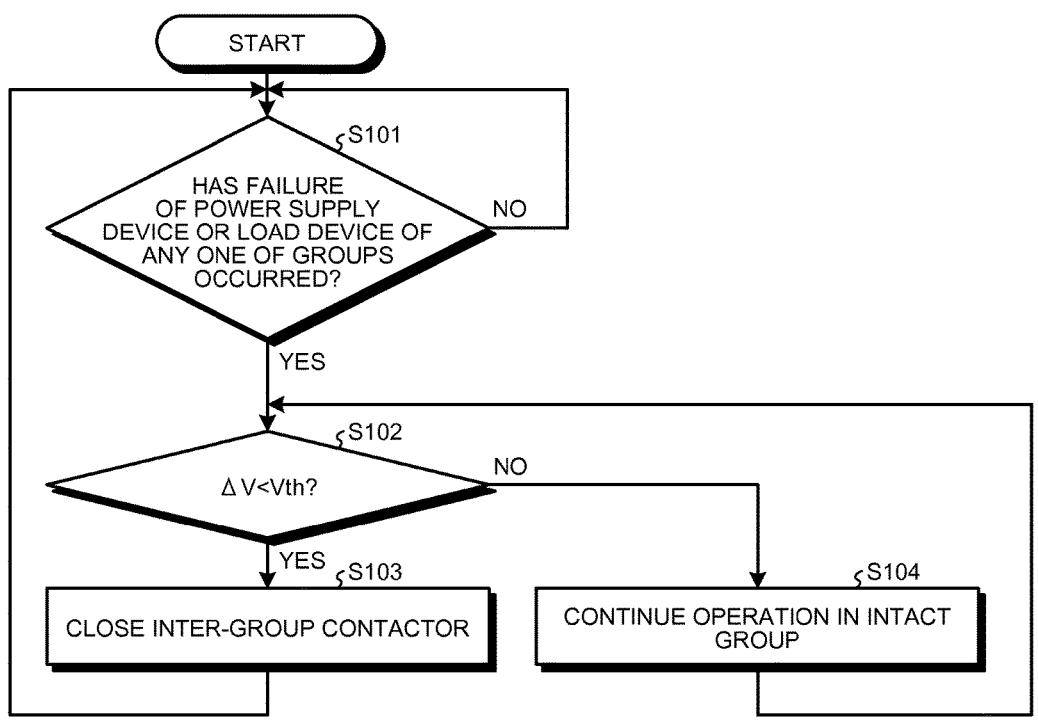
FIG. 5 is a flowchart illustrating a determination flow for determining whether the inter-group contactor is closed.

What should be noted when closing the inter-group contactor 100 and connecting the power storage devices (13 and 23) is not to generate a cross over-current between the power storage devices at the instance of the connection and not to damage the power storage devices (13 and 23). That is, when a difference $\Delta V$ of output voltages between the power storage device of the failure occurrence group and the power storage device of the intact group is larger than a threshold voltage Vth set in advance, an operation for prohibiting closing of the inter-group contactor 100 needs to be set up in the control unit 200. FIG. 5 is a flowchart illustrating a determination flow for determining whether the inter-group contactor 100 is to be closed.

In FIG. 5, first, at step S101, it is determined whether a failure has occurred in the power storage device or the load device of one of the groups. If a failure has not occurred (No at step S101), the determination processing at step S101 is repeated. If a failure has occurred (Yes at step S101), the potential difference $\Delta V$ between the power storage devices and the threshold voltage Vth set in advance are compared (step S102). If the potential difference $\Delta V$ between the power storage devices is less than the threshold voltage Vth (Yes at step S102), the inter-group contactor is closed (step S103). Thereafter, the determination processing from step S101 is repeated. In contrast, if the potential difference $\Delta V$ between the power storage devices is larger than the threshold voltage Vth (No at step S102), operation in the intact group continues (step S104) and the determination processing at step S102 is continued.

The threshold Vth can be determined, for example, as explained below. When an internal resistance value of the power storage devices (13 and 23) is represented as Rbat and, further, the wiring resistance between the power storage devices (13 and 23) via the inter-group contactor 100 is neglected, a current value I_Close at the instance of connection of the inter-group contactor can be approximated using the following expression.

$$I\_Close = \Delta V/(2 \cdot Rbat) \quad \text{(Expression 1)}$$

Therefore, in order to keep the I_Close to being equal to or less than a current value Imax allowable by the power storage devices (13 and 23), $\Delta V$ needs to satisfy the following expression.

$$\Delta V < 2 \cdot Rbat \cdot Imax = Vth \quad \text{(Expression 2)}$$

Note that, actually, depending on the characteristic of the battery cells used in the storage devices (13 and 23), the internal resistance value Rbat much changes according to the charging state, the cell temperature, and the like. Therefore, when estimating the worst condition of the cross over-current, the lowest value of the internal resistance value within a fluctuation range needs to be substituted in Rbat of the above (Expression 2) in order to estimate the worst condition.

Alternatively, in a case where things are set up so as to be able to measure and estimate the cell temperature and the charging state inside the power storage device and to measure and estimate the value of the internal resistance value Rbat, then an internal resistance estimated value of the internal resistance value Rbat can be sequentially substituted in Rbat of (Expression 2) so as to calculate the threshold Vth. Note that, when this technique is used and if the internal resistance is large, for example, a large threshold Vth is set. Therefore, there is an effect that enables an input permission condition for the inter-group contactor 100 to easily occur.

Note that step S104 in FIG. 5 is a processing flow for continuing operation in the intact group because the inter-group contactor 100 cannot be closed even though the failure occurrence group is present. At step S102 in FIG. 5, in order to allow a condition of ΔV<Vth to easily occur, it is desirable to perform control of the operations illustrated in Table 2 below while managing the control operations by the control unit 200.

TABLE 2

Operations for reducing the power storage device potential difference ΔV between the failure occurrence group and the intact group

| Mode name | Temporal control operations for the intact group |
|---|---|
| Vbat_f > Vbat_g | (1) Increase the charging current command value for a storage battery and urge the power supply device to charge the storage battery. (2) Reduce a power running command value (e.g., a torque command) of load driving for the load device, temporarily limit power consumption, and supplement improvement of Vbat_g by charging using the operation in (1). |
| Vbat_f < Vbat_g | (3) Cause the power supply device to reduce the charging current command value for the storage battery, to stop the charging, and to urge the load device to discharge by its driving. (4) Temporarily prohibit application of a regeneration command value (e.g., a regenerative torque command) for the load device and urge the load device to discharge. |

Note that, in the above Table 2, Vbat_f represents a power-storage-device output terminal voltage in the failure occurrence group and Vbat_g represents a power-storage-device output terminal voltage in the intact group. ΔV can be defined as indicated by the following expression using Vbat_f and Vbat_g.

$$\Delta V = |Vbat\_f - Vbat\_g| \quad \text{(Expression 3)}$$

The load devices (12 and 22) are devices that obtain a driving force for the vehicle. When the vehicle is a railroad vehicle, limitations on torque by a command other than a command given by the motorman need to be within an allowable range of operation schedule management. Therefore, the possibility of the operations of (2) and (4) described in Table 2 and the levels of the limitations are desirably examined during designing of the apparatus or when making operation schedule decisions.

Note that, in the case of the power supply device in the first embodiment, (1) of Table 2 is an operation that is possible if the vehicle is traveling in a section where an overhead wire is present and is impossible in a non-electrified section. Therefore, to satisfy ΔV<Vth after a failure of the device, it is useful to perform the operations in Table 2 as appropriate even during normal operation before the occurrence of the failure. If the operations are performed in advance, it is possible to immediately close the inter-group contactor 100 after the failure.

As explained above, the hybrid drive system in the first embodiment includes the inter-group contactor for electrically connecting and disconnecting the input terminals of the first power storage device connected to the first power supply device that supplies direct-current power and the second power storage device connected to the second power supply device that supplies direct-current power. Therefore, by closing the inter-group contactor, during bad conditions, during an abnormality or during the like of the first and second power supply devices, an effect is obtained whereby it is possible to continue the operation of the first and second load devices and it is possible to reduce downtime.

With the hybrid drive system in the first embodiment, if the inter-group contactor is set to an open state at a normal time and the inter-group contactor is closed when any one of the first and second power supply devices and the first and second load devices is stopped because of a failure or abnormality, or even when one of the power supply devices or one of the load devices is short-circuited and fails, an effect is obtained whereby damage to the power storage devices is limited to only one power storage device.

Note that, when the inter-group contactor is to be closed, it is desirable to close the inter-group contactor after the difference ΔV of the output voltages between the power storage devices becomes less than the set threshold voltage Vth. If such control is performed, an effect is obtained whereby it is possible to reduce, as much as possible, the rush current between the power storage devices that occurs when the inter-group contactor is closed.

It is desirable to reduce the voltage difference between the power storage devices by charging and discharging the power storage devices before a problem occurs. If controlled such, there is an effect whereby it is possible to enable a permission condition for closing the inter-group contactor to be easily generated. An effect is obtained whereby it is possible to ensure connection of the groups.

It is desirable to provide switching devices for circuit opening at the input or the output of the first and second power supply devices. By providing such switching devices, when one of the first and second power supply devices is stopped because of a problem, an effect is obtained whereby it is possible to ensure the mechanical disconnection of the stopped power supply device and it is possible to easily perform closing of the inter-group contactor and operation resumption of the load device.

Second Embodiment

Figure 6:
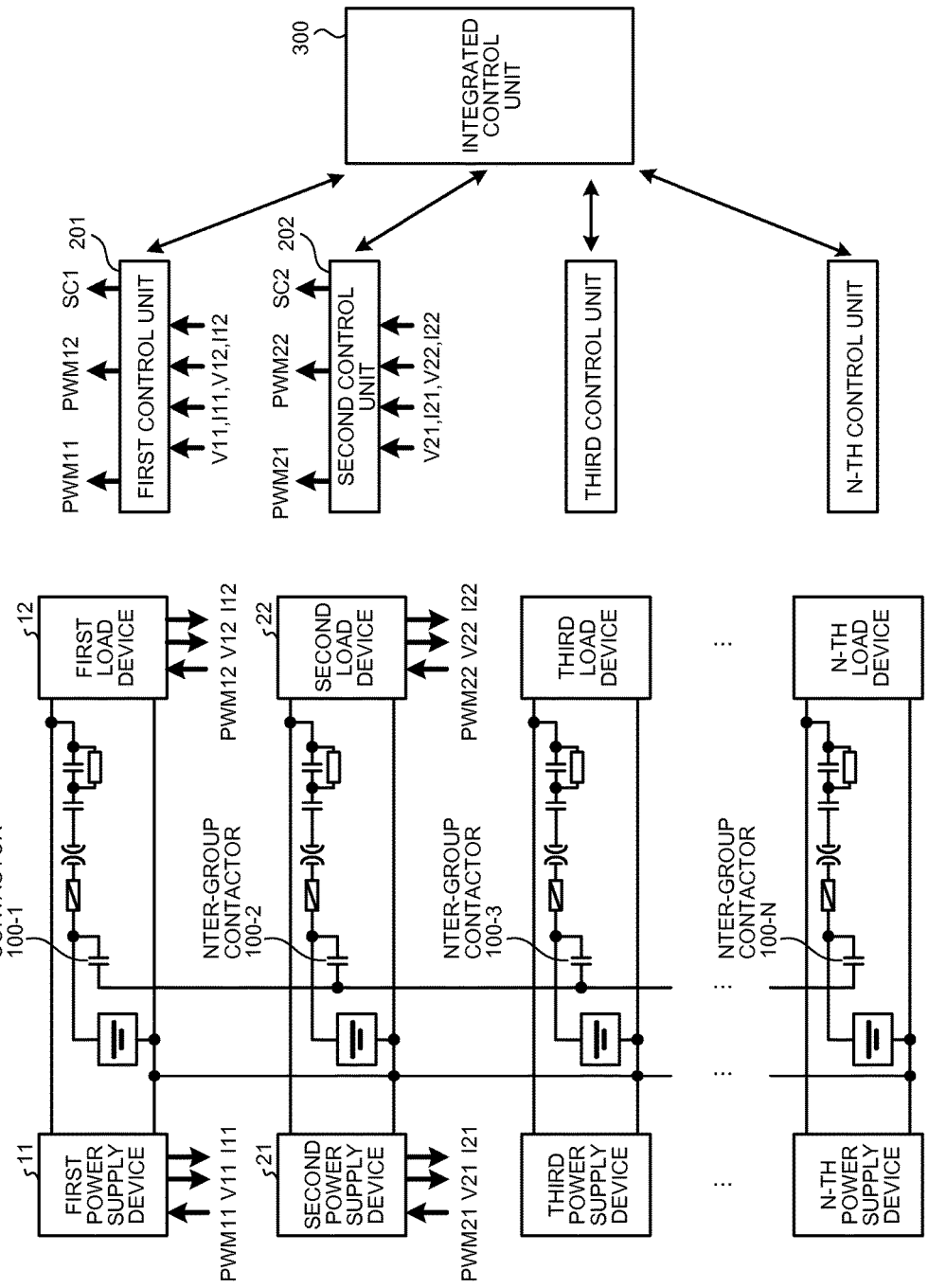
FIG. 6 is a diagram illustrating an example configuration of a hybrid drive system according to a second embodiment.

FIG. 6 is a diagram illustrating an example configuration of a hybrid drive system according to a second embodiment. A configuration is illustrated in which, two or more groups of the hybrid systems in the first embodiment illustrated in FIG. 1 are present in a formation and corresponding inter-group contactors having a purpose the same as the purpose in the first embodiment are provided. Specifically, in the configuration, when the numbers of groups of hybrid systems is represented as N, as many inter-group contactors as hybrid system groups, i.e., N inter-group contactors 100-1 to 100-N, are provided. Note that, in FIG. 6, the components the same as or equivalent to the components in the first embodiment are denoted by the same reference numerals and signs and redundant explanation of these components is omitted.

As in the first embodiment, the inter-group contactors 100-1 to 100-N are always set to an open state during normal operation. When the power supply device of any one of the groups (the first to N-th power supply devices) or the load device of any one of the groups (the first to N-th load devices) fails, the inter-group contactor of the failure occurrence group and at least one or more inter-group contactors among the other N−1 inter-group contactors are closed so as to connect the power storage device of the failure occurrence group and one of the N−1 power storage devices of the other groups. Consequently, in the hybrid drive system in which three or more hybrid systems are present, as in the first embodiment, it is possible to effectively use a storage battery of the failure occurrence group.

Note that, in the first embodiment, a configuration is explained in which the one control unit 200 manages the control of the two power supply devices (11 and 21) and the two load devices (12 and 22). However, in the case of the second embodiment including the N power supply devices (11, 21, . . . ) and the N load devices (12, 22, . . . ), it is useful in simplifying signal processing and device configuration to provide the first to N-th control units (201, 202, . . . ) that perform control of the groups and an integrated control unit 300 that monitors and controls state information of the first to N-th control units and share functions among the control units. An example of this function sharing is given below.

(Integrated Control Unit)

(1) Output of operation commands (power running/regeneration/operation stop/reset, etc.) to all the control units (2) State monitoring (voltage/current state monitoring and protection occurrence monitoring) of all the control units (3) Connection treatment of any one of the inter-group contactors in the case of the occurrence of protection in any one of the groups (Control Units of the Groups)

(1) Power conversion control of the groups conforming to the operation commands (power running/regeneration/operation stop/reset, etc.) input from the integrated control unit (2) Output the data including voltage and current states and protection occurrence states of the groups to the integrated control unit 300

(3) Inter-group contactor operation conforming to an inter-group contactor opening and closing command output from the integrated control unit 300

The first to N-th control units (201, 202, . . . ) that perform the control of the groups are housed in the vicinity of the main circuits of the groups corresponding to the control units or stored in the same box. Consequently, it is possible to reduce the wiring length of the main circuit control, which requires a large number of signal lines and it is possible to suppress noise, wiring costs, and the like. Further, the integrated control unit 300, which needs to exchange signals related to all the groups, is disposed in one place of the formation. If the integrated control unit 300 is provided, for example, in the vicinity of a motorman's cab, it is possible to reduce the cost of signal wiring to and from operation devices.

When the number of system groups is three, as in the configuration in the second embodiment, the following effects absent in the first embodiment can be obtained by an operation method of the inter-group contactors 100-1 to 100-N.

(1) Effective Use of the Power Storage Device of the Failure Occurrence Group

When closing the inter-group contactor of the failure occurrence group and closing one or more of the N−1 inter-group contactors of the intact groups, there is flexibility, as illustrated in Table 3 below, to select one or more contactors among the N−1 inter-group contactors. Note that numerical values illustrated in the table are charging capacities obtained when a failure occurs only in one group and the power storage device of the group is connected to several groups among the remaining intact groups. The charging capacities are represented as a fraction of a charging capacity maximum set to 1 of the power storage devices of the intact groups to which the inter-group contactors are not connected.

TABLE 3

Power storage device charging capacity per one group at the time when the inter-group contactors are operated in the number of N groups.

| | Power storage device charging capacity per group of the connected groups | Power storage device charging capacity of the intact groups not connected |
| --- | --- | --- |
| (a) Power storage device of the failure group is connected to only one single intact group | 2 | 1 |
| (b) Power storage device of the failure group is connected to all of the remaining N − 1 intact groups | N/(N − 1) | |

In Table 3, in (a), the power storage device of the failure group is connected to only one intact group and, in (b), the power storage device of the failure group is connected to all of the remaining N−1 intact groups.

In the method of (b), because all the N power storage devices are connected, charging and discharging are uniformly performed. Further, in the method of (a), the power storage device charging capacity per load device is doubled only in a place where the inter-group contactor 100 is closed. Therefore, the charging and discharging amount change per power storage device is halved. A difference occurs during the transition of a state of charge (SOC) between the failure group and the other groups. Therefore, (b) is advantageous in terms of equalization of the rates of use of the power storage devices. Further, as in the first embodiment, the method of (a) maintains, when a device failure occurs, a reduction of spreading the effect to the other groups. Therefore, to connect the power storage device of the failure group to the intact groups, for example, one of the methods of (a) and (b) only has to be adopted depending on the purpose.

(2) Redundancy in the Number of Failure Occurrence Places

In the first embodiment, when both of the two load devices fail, traveling is impossible. Further, when the two power supply devices fail, charging is also impossible. Traveling is impossible at the time when the power storage device capacity decreases to a lower limit. In contrast, in the second embodiment, if at least one of the N load devices remains functioning, traveling of the formation can be continued. In that case, if the power storage devices are connected to the remaining load devices, it is possible to maintain a traveling distance in a non-electrified section. Further, if at least one of the N power storage devices remains functioning, by connecting the inter-group contactor, although a charging time increases, it is possible to perform a charging operation for all the power storage devices of the formation and maintain the traveling distance in the non-electrified section.

Note that, in the second embodiment, as the N load devices of the N hybrid system groups, besides devices related to vehicle propulsion the same as the load device in the first embodiment, some of the load devices can be auxiliary power supply devices (SIVs) that perform power supply to, for example, power supplies of service devices in the formation, the control units (201, 202, . . . ), and the integrated control unit 300. The auxiliary power supply device performs power supply to important functions of vehicle control such as the control units and the integrated control unit. Therefore, in some aspects, operation continuity of the auxiliary power supply devices is more important than operation continuity of a traveling device. Therefore, in improving redundancy of the hybrid system groups, it is important to take into account the operation continuity of the auxiliary power supply device.

As explained above, the hybrid drive system in the second embodiment includes the two or more system groups including the power supply devices that supply direct-current power; the power storage devices connected to the power supply devices to accumulate or discharge the direct-current power; the load devices that receive the supply of the direct-current power from the power supply devices and the power storage devices and drive a load; and the inter-group contactors for electrically connecting input and output terminals of the power storage devices to input and output terminals of other power storage devices. Therefore, by closing the inter-group contactor during bad conditions, during an abnormality, or during the like of at least one power supply device among a plurality of power supply devices, an effect is obtained whereby it is possible to continue the operation of the load device to which the power supply device having a problem is connected, and it is possible to reduce downtime.

With the hybrid drive system in the second embodiment, if all the inter-group contactors are set to an open state at normal time and, when the power supply device or the load device in one system group among a plurality of sets is stopped during an operation because of a problem, the inter-group contactor in the system group having the problem is closed and at least one of the inter-group contactors in the other system groups is closed to connect the power storage device in the system group including the power supply device stopped during an operation to the other system groups, even when any one of the power supply devices or any one of the load devices are short-circuited and fails, an effect is obtained whereby damage to the power storage devices is limited to only the power storage device on one side.

Note that it is desirable to provide switching devices for circuit opening in the inputting or the outputting of all the power supply devices. By providing such switching devices, when any one of the power supply devices is stopped because of a problem, an effect is obtained whereby it is possible to ensure the mechanical disconnection of the stopped power supply device and it is possible to easily perform closing of the inter-group contactor and operation resumption of the load device.

Third Embodiment

Figure 7:
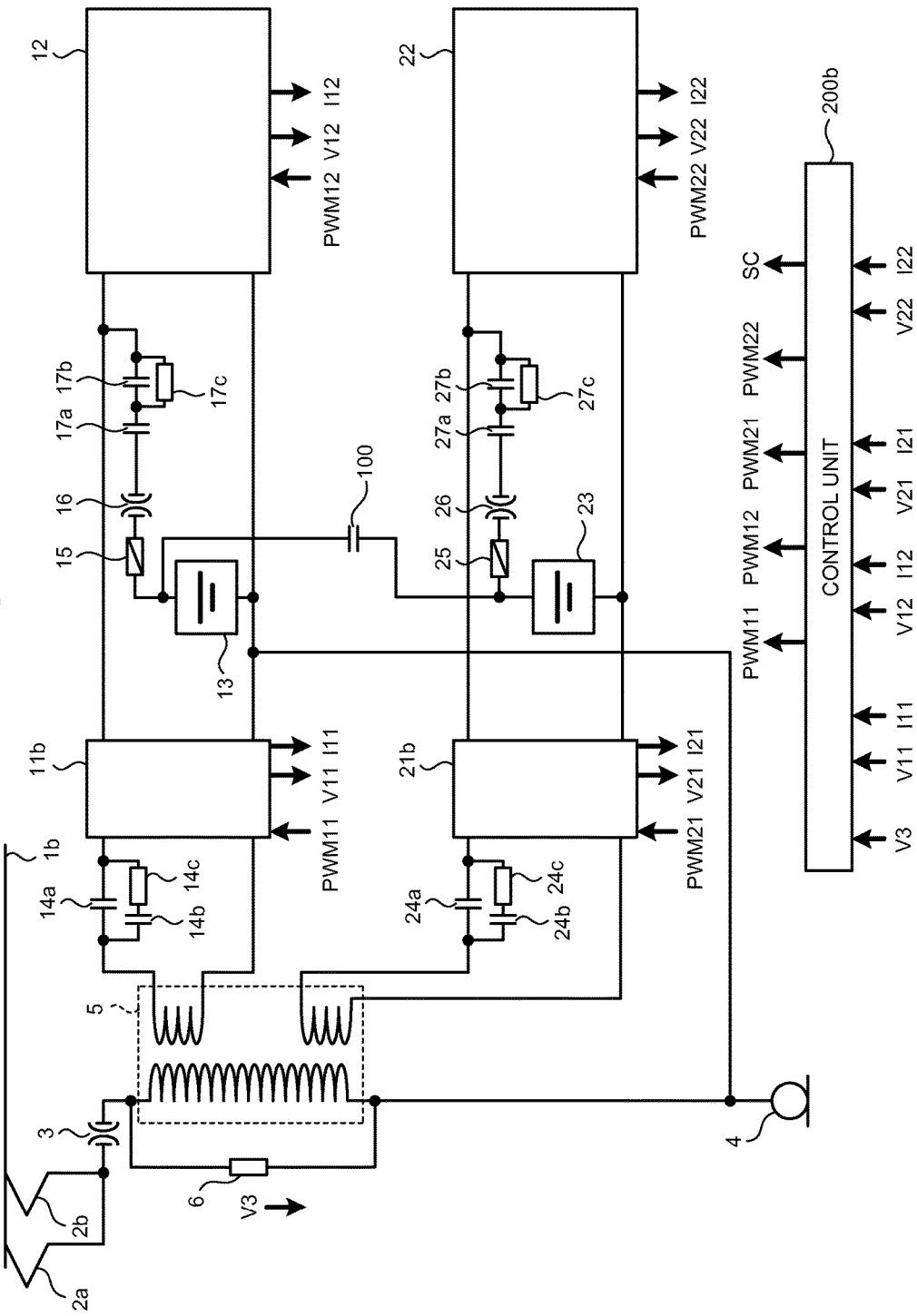
FIG. 7 is a diagram illustrating an example configuration of a hybrid drive system according to a third embodiment.

FIG. 7 is a diagram illustrating an example configuration of a hybrid drive system according to a third embodiment. The hybrid system group in the first embodiment receives direct-current power via the direct-current overhead wire 1 as an input. In contrast, the hybrid drive system in the third embodiment receives alternating-current power via an alternating-current overhead wire 1*b* as an input. Specifically, a transformer 5 is provided on the input side of power supply devices 11*b* and 21*b* and an input-voltage measuring unit 6 that measures the voltage applied to the primary side of the transformer 5 (a transformer primary voltage: V3) is provided. Note that, in FIG. 7, components the same as or equivalent to the components in the first embodiment are denoted by the same reference numerals and signs, and redundant explanation of these components is omitted.

In the third embodiment, it is possible to obtain effects of the inter-group contactors the same as the effects in the first embodiment, i.e., effects such as the effective use of the power storage devices during failure occurrence and ensuring a traveling distance in a non-electrified section.

The alternating-current power from the alternating-current overhead wire 1*b* is input to a primary winding wire of the transformer 5 via the pantographs 2*a* and 2*b* and the overhead wire breaker 3. The transformer 5 includes the same number of sets of secondary winding wires corresponding as the number of hybrid system groups. The transformer 5 steps down the overhead wire voltage to a voltage suitable for the main circuits of the power supply devices (11*b* and 21*b*) in a later stage. Outputs from the secondary winding wires of the transformer 5 are input once to the power supply device 11*b* via the contactors 14*a* and 14*b* and the charging resistor 14*c*. In FIG. 7, concerning connection of the contactors 14*a* and 14*b* and the charging resistors 14*c*, a configuration is illustrated in which the contactor 14*b* is closed only during a charging operation. Consequently, after the charging operation, the contactor 14*b* can open. Therefore, it is possible to suppress energization heat generation in the charging resistor 14*c*.

The power supply devices 11*b* and 21*b* in the third embodiment are devices that convert supplied alternating-current power into direct-current power having a direct-current voltage suitable for the load devices 12 and 22 and the power storage devices 13 and 23. On the basis of measurement information from the input-voltage measuring unit 6 that measures the primary side voltage of the transformer 5 and input current information and output voltage information on the insides of the power supply devices 11*b* and 21*b* not illustrated in the figure, a control unit 200*b* generates ON/OFF signals (PWM signals) for semiconductor switches from which power-supply-device main circuit units are configured and are included in the power supply devices 11*b* and 21*b*, respectively. Due to this control, an AC-DC conversion operation is performed in the power supply devices 11*b* and 21*b*.

The load devices 12 and 22 can be propulsion control devices for subjecting a railroad vehicle to propulsion control, can be auxiliary power supply devices for supplying electric power to devices other than the propulsion control devices in the railroad vehicle, or can be power supply devices in a station building. When the load devices 12 and 22 are the propulsion control devices, the load devices 12 and 22 include power converting devices that convert supplied direct-current power into alternating-current power having a variable frequency and a variable voltage amplitude, alternating-current motors driven by the alternating-current power, and traveling devices that transmit driving forces output by the alternating-current motors to the wheels. When the load devices 12 and 22 are the auxiliary power supply devices, the load devices 12 and 22 perform operations for converting supplied direct-current power into alternating-current power having a fixed frequency and a fixed voltage amplitude and supplying the alternating-current power to devices mounted on the vehicle.

In the third embodiment, it is possible to obtain, under a condition where the vehicle travels under the alternating-current overhead wire 1b, the effects of the inter-group contactor 100 the same as the effects in the first embodiment, i.e., the effects such as effective use of the power storage devices during failure occurrence and ensuring of a traveling distance in a non-electrified section.

Fourth Embodiment

Figure 8:
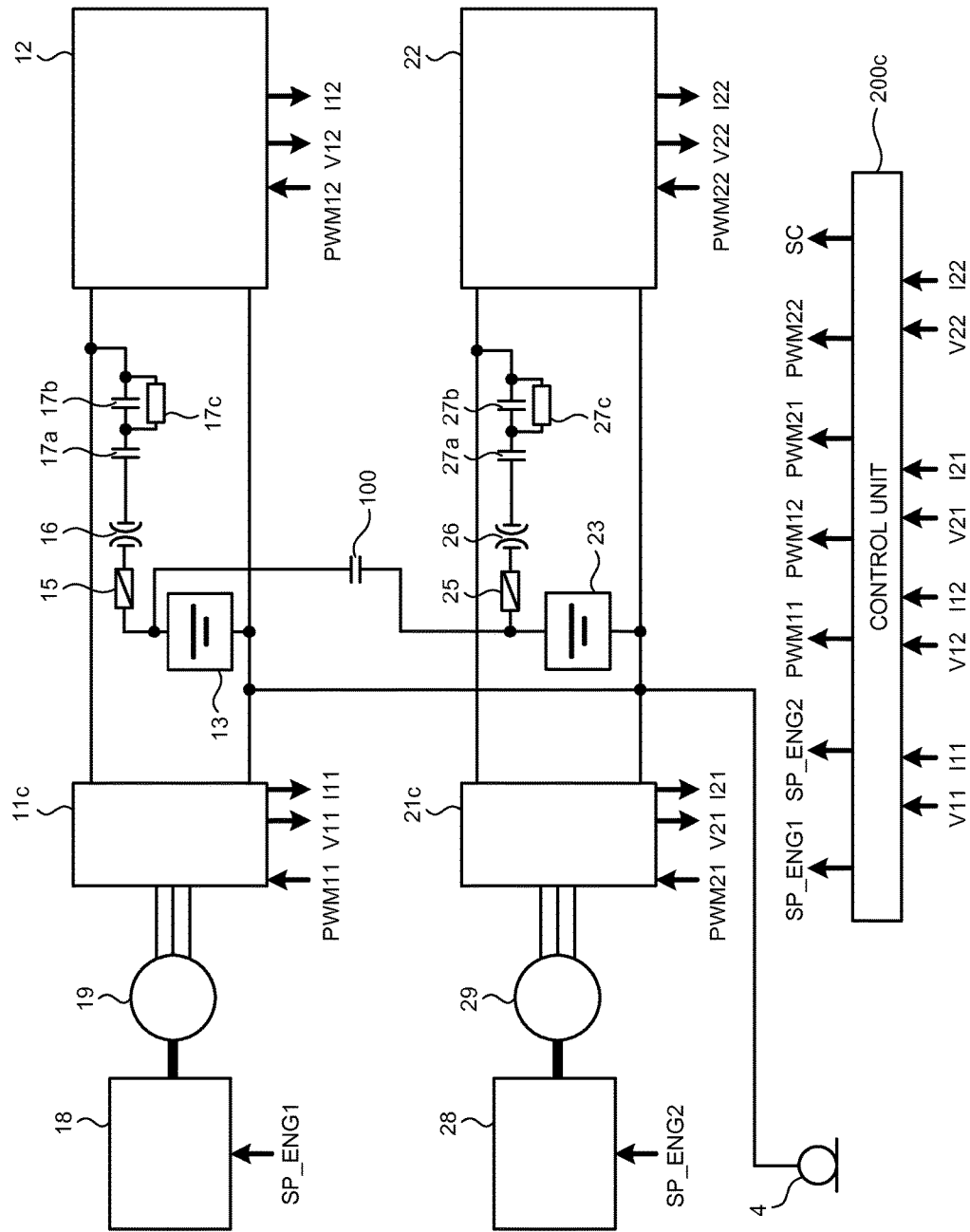
FIG. 8 is a diagram illustrating an example configuration of a hybrid drive system according to a fourth embodiment.

FIG. 8 is a diagram illustrating an example configuration of a hybrid drive system according to a fourth embodiment. In the first to third embodiments, the electric power from the overhead wire (the first and second embodiments: the direct-current overhead wire, the third embodiment: the alternating-current overhead wire) is received as the input. Meanwhile, in the fourth embodiment, the power generating device is an internal combustion engine and a generator. Here in FIG. 8, components the same as or equivalent to the components in the first embodiment are denoted by the same reference numerals and signs and redundant explanation of these components is omitted.

Engines 18 and 28 are internal combustion engines, such as diesel engines. Mechanical output shafts of the engines 18 and 28 and rotating shafts of generators 19 and 29 are directly connected or connected via not-illustrated gears, pulleys, and the like. The generators 19 and 29 are alternating-current generators. For example, three-phase alternating-current power is obtained and respectively input to power supply devices 11c and 21c. Note that, as illustrated in the figure, the engines 18 and 28, the generators 19 and 29, and the power supply devices 11c and 21c are components of the hybrid drive system and are basically disposed and connected by the number of sets of groups.

The power supply devices 11c and 21c are power converters that convert alternating-current power from the generators 19 and 29 into direct-current power to the power storage devices 13 and 23 and the load devices 12 and 22. The power supply devices 11c and 21c operate according to signal exchange explained below.

When it is desired to cause the power supply devices 11c and 21c to output direct-current power, first, a control unit 200c outputs notch signals (SP_ENG1 and SP_ENG2), which are speed commands or digital bit signals corresponding to the speed commands, to the engines 18 and 28. The engines 18 and 28 start operation with a speed characteristic conforming to the commands. Then, the control unit 200c controls the torque of the generators 19 and 29 on the basis of input current information and output voltage information obtained by the power supply devices 11c and 21c. According to such control, electric power corresponding to the speed×the torque is generated in the generators 19 and 29. A direct-current power output is obtained from the main circuit operations of the power supply devices 11c and 21c.

Note that the configuration described in the fourth embodiment is a device configuration not relying on electric power from an overhead wire. The traveling distance in a non-electrified section does not rely on the capacity of a power storage device unless the remaining fuel amount of an engine is taken into account. However, when a load device of a failure occurrence group becomes unusable because of a failure of the power supply devices 11c and 21c, a failure of the engines 18 and 28 or the generators 19 and 29, or the like, it is desirable to reduce a decrease in acceleration per formation as much as possible. Therefore, an improvement of traveling performance (a torque characteristic) of load devices of remaining intact groups (emergency time traveling performance) is sometimes included in a requirement of a railroad vehicle. In this case, it is likely that discharge power [W] of storage devices of the intact groups is larger than the discharge power at a normal time. In such a case, if a power storage capacity of the power storage devices of the intact groups can be increased by closing the inter-group contactor 100, it is easy to maintain the traveling performance at an emergency time.

If the operating time of the engine and the generator on the functioning side is increased with respect to the capacity increase of the power storage devices, even in a configuration in which the output [W] cannot be increased, an aspect thereof makes it possible to increase the charging amount and an effect is obtained whereby it is easy to maintain the traveling performance at emergency time.

That is, in the fourth embodiment, it is possible to obtain effects of the inter-group contactor the same as the effects the first embodiment offers, i.e., an effect that makes it possible to effectively use the electric power of the power storage devices during failure occurrence.

Fifth Embodiment

In the first to fourth embodiments, the input to the power supply devices is the electric power from the overhead wire or the generator output from the engine. However, although not illustrated in the figure, it goes without saying that the input to the power supply devices can be another power source, such as a fuel cell. If a device is configured using an inter-group contactor as in the first to fourth embodiments, it is possible to configure a configuration in which the power storage devices are effectively used in an entire formation during the failure of the power supply devices or the load devices.

Note that the configurations explained in the embodiments are some examples of the configuration of the present invention. It goes without saying that the configurations can be combined with other widely-known technologies and can be changed to, for example, omit a part of the configurations in a range not departing from the spirit of the present invention.

INDUSTRIAL APPLICABILITY

As explained above, the present invention is useful as a hybrid drive system that can effectively utilize a power storage device provided on the power supply device side in which a problem occurs.

REFERENCE SIGNS LIST

1 Direct-current overhead wire
1b Alternating-current overhead wire
2 (2a, 2b) Pantographs
3 Overhead wire breaker
4 (4a, 4b) Wheels
5 Transformer
6, 114 Input-voltage measuring units
11 (11b, 11c), 21 (21b, 21c) Power supply devices
12, 22 Load devices
13, 23 Power storage devices
14a, 14b 17a, 17b, 24a, 24b, 27a, 27b Contactors
14c, 17c, 24c, 27c Charging resistors
15, 25 Fuses (Over-current protection elements)
16, 26 Breakers
18, 28 Engines
19, 29 Generators
100 Inter-group contactor
111 Filter reactor
112 Input-current measuring unit
113, 122 Filter capacitors
115 Power-supply-device main circuit unit
116 Output reactor
117 Output-current measuring unit
118 Output-voltage measuring unit
121 Load-input-current measuring unit
123 Load-input-voltage measuring unit
124 Load-device main circuit unit
125 Load-output-current measuring unit
126a, 126b Alternating-current motors
200 (200b, 200c, 201, 202) Control unit
300 Integrated control unit

The invention claimed is:

1. A hybrid drive system that includes
first and second power supply devices that supply direct-current power,
first and second power storage devices respectively connected to the first and second power supply devices to accumulate or discharge the direct-current power,
a first load device that receives supply of the direct-current power from the first power supply device and the first power storage device and drives a first load, and
a second load device that receives supply of the direct-current power from the second power supply device and the second power storage device and drives a second load,
the hybrid drive system comprising
an inter-group contactor for electrically connecting and disconnecting an input terminal of the first power storage device to and from an input terminal of the second power storage device.

2. The hybrid system according to claim 1, wherein the inter-group contactor is set to be in an open state at normal time and to be closed when one of the first and second power supply devices and the first and second load devices is stopped because of a problem.

3. A hybrid drive system comprising two or more system groups, each of the system groups including
a power supply device that supplies direct-current power,
a power storage device connected to the power supply device to accumulate or discharge the direct-current power,
a load device that receive supply of the direct-current power from the power supply device and the power storage device and drives a load, and
an inter-group contactor for electrically connecting input and output terminals of the power storage device with input and output terminals of another power storage device.

4. The hybrid drive system according to claim 3, wherein all the inter-group contactors are set to an open state at a normal time, and
when an operation of the power supply device or the load device in one system group among the plurality of the groups is stopped because of a problem,
the inter-group contactor in the system group having the problem is closed, and
at least one of the inter-group contactors in the other system groups is closed so as to connect the power storage device in the system group including the power supply device of which operation is stopped with the other system groups.

5. The hybrid drive system according to claim 1, wherein switching devices for circuit opening are provided at inputs or outputs of all the power supply devices, and
when any one of the power supply devices is stopped because of a problem, the switching device for the input or the output of the power supply device that has been stopped is opened.

6. The hybrid drive system according to claim 1, wherein, when the inter-group contactor is closed, the inter-group contactor is closed after a difference in value of output voltages between the power storage devices becomes less than a set threshold.

7. The hybrid drive system according to claim 6, wherein the voltage difference between the power storage devices is reduced by charging and discharging of the power storage device in the system group side in which the problem does not occur.

8. The hybrid drive system according to claim 6, wherein, when a power storage device voltage of the system group in which a problem occurs is larger than a power storage device voltage of the system group in which a problem does not occur, power running performance of the load device included in the system group in which the problem does not occur is suppressed or power running of the load device is prohibited so as to reduce the voltage difference between the power storage devices.

9. The hybrid drive system according to claim 6, wherein, when a power storage device voltage of the system group in which a problem occurs is less than a power storage device voltage of the system group in which a problem does not occur, regeneration of the load device included in the system group in which the problem does not occur is suppressed so as to reduce the voltage difference between the power storage devices.

10. The hybrid drive system according to claim 1, wherein the load device includes
a power converting device that converts the supplied direct-current power into alternating-current power having a variable frequency and a variable voltage amplitude, and
an alternating-current motor driven by the alternating-current power.

11. The hybrid drive system according to claim 1, wherein the load device converts the supplied direct-current power into alternating-current power having a fixed frequency and a fixed voltage amplitude and supplies the alternating-current power to a device mounted on a vehicle.

12. The hybrid drive system according to claim 1, wherein the power supply device includes a DC-DC converter that converts a voltage value of direct-current power supplied from a direct-current overhead wire into a direct-current voltage suitable for the power storage device.

13. The hybrid drive system according to claim 1, wherein the power supply device includes an AC-DC converter that converts alternating-current power supplied from an alternating-current overhead wire into direct-current power having a direct-current voltage suitable for the power storage device.

14. The hybrid drive system according to claim 1, wherein the power supply device includes
   a generator driven by an internal combustion engine and
   an AC-DC converter that converts alternating-current power supplied from the generator into direct-current power having a direct-current voltage suitable for the power storage device.

15. The hybrid drive system according to claim 1, wherein the power supply device includes
   a fuel battery and
   a DC-DC converter that converts direct-current power supplied from the fuel battery into direct-current power having a direct-current voltage suitable for the power storage device.

16. The hybrid drive system according to claim 3, wherein switching devices for circuit opening are provided at inputs or outputs of all the power supply devices, and when any one of the power supply devices is stopped because of a problem, the switching device for the input or the output of the power supply device that has been stopped is opened.

17. The hybrid drive system according to claim 3, wherein,
   when the inter-group contactor is closed, the inter-group contactor is closed after a difference in value of output voltages between the power storage devices becomes less than a set threshold.

18. The hybrid drive system according to claim 3, wherein the load device includes
   a power converting device that converts the supplied direct-current power into alternating-current power having a variable frequency and a variable voltage amplitude, and
   an alternating-current motor driven by the alternating-current power.

19. The hybrid drive system according to claim 3, wherein the load device converts the supplied direct-current power into alternating-current power having a fixed frequency and a fixed voltage amplitude and supplies the alternating-current power to a device mounted on a vehicle.

20. The hybrid drive system according to claim 3, wherein the power supply device includes a DC-DC converter that converts a voltage value of direct-current power supplied from a direct-current overhead wire into a direct-current voltage suitable for the power storage device.

21. The hybrid drive system according to claim 3, wherein the power supply device includes an AC-DC converter that converts alternating-current power supplied from an alternating-current overhead wire into direct-current power having a direct-current voltage suitable for the power storage device.

22. The hybrid drive system according to claim 3, wherein the power supply device includes
   a generator driven by an internal combustion engine and
   an AC-DC converter that converts alternating-current power supplied from the generator into direct-current power having a direct-current voltage suitable for the power storage device.

23. The hybrid drive system according to claim 3, wherein the power supply device includes
   a fuel battery and
   a DC-DC converter that converts direct-current power supplied from the fuel battery into direct-current power having a direct-current voltage suitable for the power storage device.

* * * * *